(12) United States Patent
Watanabe

(10) Patent No.: US 8,672,084 B2
(45) Date of Patent: Mar. 18, 2014

(54) REAR WHEEL STEERING SYSTEM

(75) Inventor: Takeshi Watanabe, Kashihara (JP)

(73) Assignee: JTEKT Corporation, Osaka-Shi (JP)

( * ) Notice: Subject to any disclaimer, the term of this patent is extended or adjusted under 35 U.S.C. 154(b) by 40 days.

(21) Appl. No.: 13/481,261

(22) Filed: May 25, 2012

(65) Prior Publication Data

US 2012/0319374 A1 Dec. 20, 2012

(30) Foreign Application Priority Data

Jun. 20, 2011 (JP) ................................ 2011-136350

(51) Int. Cl.
*B62D 7/14* (2006.01)
(52) U.S. Cl.
USPC ............................ 180/409; 180/408; 180/410
(58) Field of Classification Search
USPC ................................................. 180/408–410
See application file for complete search history.

(56) References Cited

U.S. PATENT DOCUMENTS

2007/0006620 A1* 1/2007 Fukushima ..................... 70/186

FOREIGN PATENT DOCUMENTS

| DE | 41 11 799 A1 | 10/1992 |
|---|---|---|
| FR | 1050781 A | 1/1954 |
| JP | A 3-57777 | 3/1991 |
| JP | A 3-57778 | 3/1991 |
| JP | A-2006-35917 | 2/2006 |

OTHER PUBLICATIONS

Oct. 4, 2012 Extended Search Report issued in European Patent Application No. EP 12170598.2.

* cited by examiner

*Primary Examiner* — Kevin Hurley
*Assistant Examiner* — Michael Stabley
(74) *Attorney, Agent, or Firm* — Oliff PLC

(57) ABSTRACT

A rear wheel steering system includes a rear rack shaft that slides in a vehicle-width direction to steer a pair of rear wheels, a recess formed in the rear rack shaft, and a pin member that is fitted into the recess from the outer side of the rear rack shaft, and is retracted to be disengaged from the recess. The pin member is fitted into the recess to lock sliding of the rear rack shaft in a neutral position, and the pin member placed in a retracted state is disengaged from the recess to cancel slide lock on the rear rack shaft. The rear rack shaft has guide grooves formed on respective sides of the recess in a longitudinal direction of the rear rack shaft so as to be contiguous with the recess, and used to guide the pin member, placed in the advanced state, toward the recess.

3 Claims, 6 Drawing Sheets

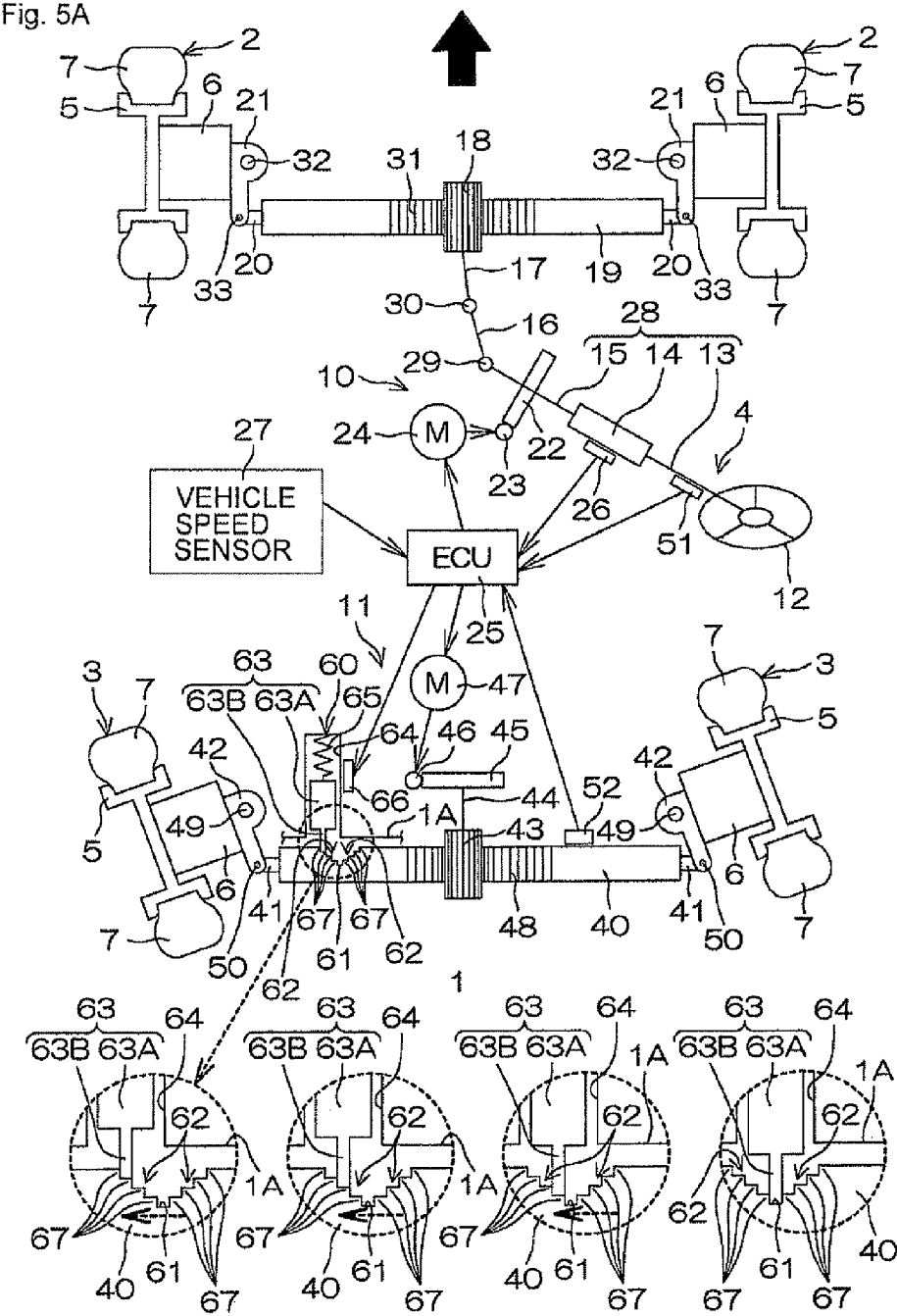

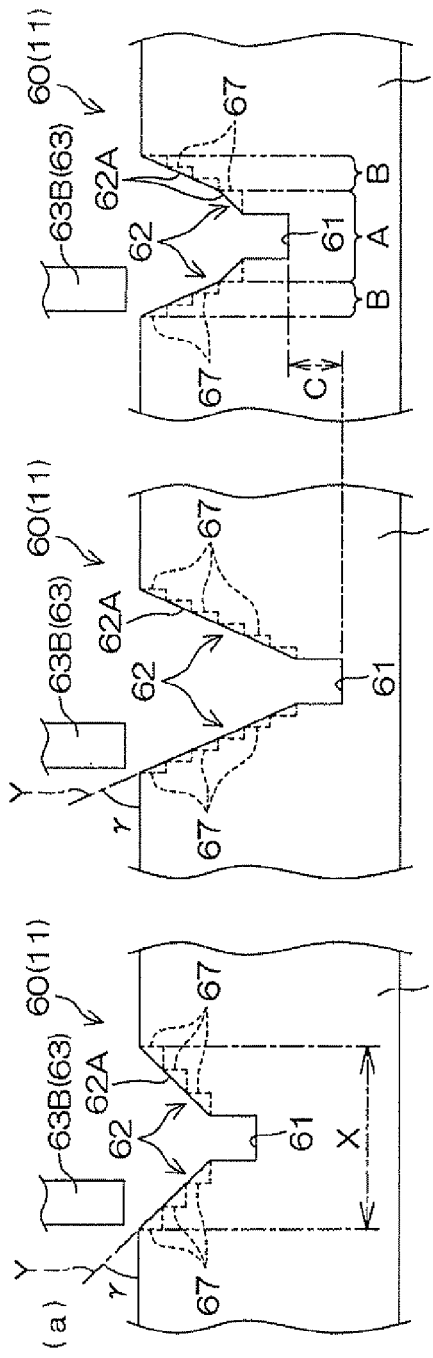
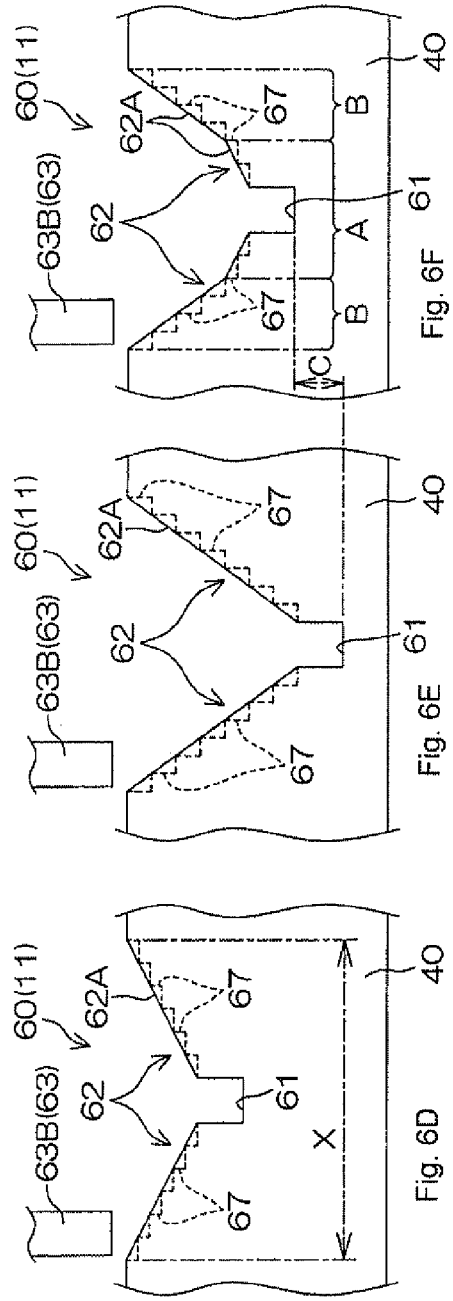
Fig. 6A Fig. 6B Fig. 6C Fig. 6D Fig. 6E Fig. 6F

REAR WHEEL STEERING SYSTEM

INCORPORATION BY REFERENCE

The disclosure of Japanese Patent Application No. 2011-136350 filed on Jun. 20, 2011 including the specification, drawings and abstract, is incorporated herein by reference in its entirety.

BACKGROUND OF THE INVENTION

1. Field of the Invention

The invention relates to a rear wheel steering system that is applicable to a four-wheel steering vehicle of which the front wheels and the rear wheels are both able to be steered.

2. Description of Related Art

There is a four-wheel steering vehicle of which the front wheels and the rear wheels are both able to be steered. When the four-wheel steering vehicle is traveling at a low speed, for example, when the vehicle is being parked, the rear wheels in addition to the front wheels are steered and thus the vehicle is able to turn in a small radius. Thus, for example, during parallel parking, the direction in which a steering wheel is rotated need not be changed so many times. There is a rear wheel steering system that steers the rear wheels in such a four-wheel steering vehicle (see Japanese Patent Application Publication No. 2006-035917 (JP 2006-035917A)).

JP 2006-035917A describes an example of a four-wheel steering vehicle. Specifically, a pair of right and left knuckle shafts, to which respective rear wheels are fitted, are fitted to a rear portion of a vehicle body such that the knuckle shafts are able to be steered. The knuckle shafts are coupled to each other via a tie rod respectively. In addition, piston rods of steering cylinders fitted to the vehicle body are coupled to the respective knuckle shafts, and the knuckle shafts are steered together with the rear wheels based on the strokes of the piston rods. In the four-wheel steering vehicle described in JP 2006-035917A, the knuckle shafts, the tie rods and the steering cylinders constitute the rear wheel steering system.

When the four-wheel steering vehicle is travelling at a high speed, it is desirable that steering of the rear wheels be locked in a neutral state where the steered angle of the rear wheels is zero, in order to stabilize the vehicle body. However, steering of the rear wheels may be locked in a state where the steered angle of the rear wheels has not been completely returned to zero due to an unexpected trouble, or the like. In such a case, it is desirable that the rear wheels should be returned to the neutral state after steering of the rear wheels is locked.

SUMMARY OF THE INVENTION

The invention provides a rear wheel steering system that is able to reliably return rear wheels to a neutral state if steering of the rear wheels is locked before the rear wheels are completely returned to the neutral state.

An aspect of the invention relates to a rear wheel steering system that is applicable to a four-wheel steering vehicle of which front wheels and rear wheels are both able to be steered. The rear wheel steering system includes: a coupling arm that is provided between and connected to a pair of the rear wheels, and that slides in a vehicle-width direction to steer the pair of the rear wheels; a recess that is formed in the coupling arm; a pin member that is able to be fitted into the recess from an outer side of the coupling arm, that is provided at a position at which the pin member faces the recess when the coupling arm is in a neutral position in which the coupling arm does not slide in the vehicle-width direction, that is fitted into the recess to lock sliding of the coupling arm when the pin member is placed in an advanced state, and that is disengaged from the recess to cancel slide lock on the coupling arm when the pin member is placed in a retracted state; and advance/retraction control means for placing the pin member in the retracted state when a vehicle speed is lower than or equal to a predetermined speed and for placing the pin member in the advanced state when the vehicle speed is higher than the predetermined speed. The coupling arm has guide grooves that are formed on respective sides of the recess in a longitudinal direction of the coupling arm so as to be contiguous with the recess, and that are used to guide the pin member in the advanced state toward the recess.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A shows a state where front wheels 2 are returned to a neutral state in FIG. 4;

FIG. 5B is an enlarged view of a main portion in FIG. 5A;

FIG. 5C to FIG. 5E show a transition in the state of the main portion shown in FIG. 5A in a time sequence as the four-wheel steering vehicle 1 travels straight ahead; and FIG. 6A to FIG. 6F are sectional views of a main portion of a rear rack shaft 40 near a recess 61 and guide grooves 62, where FIG. 6A shows guide grooves 62 according to a first alternative embodiment, FIG. 6B shows guide grooves 62 according to a second alternative embodiment, FIG. 6C shows guide grooves 62 according to a third alternative embodiment, FIG. 6D shows guide grooves 62 according to a fourth alternative embodiment, FIG. 6E shows guide grooves 62 according to a fifth alternative embodiment, and FIG. 6F shows guide grooves 62 according to a sixth alternative embodiment.

DETAILED DESCRIPTION OF EMBODIMENTS

Figure 1:
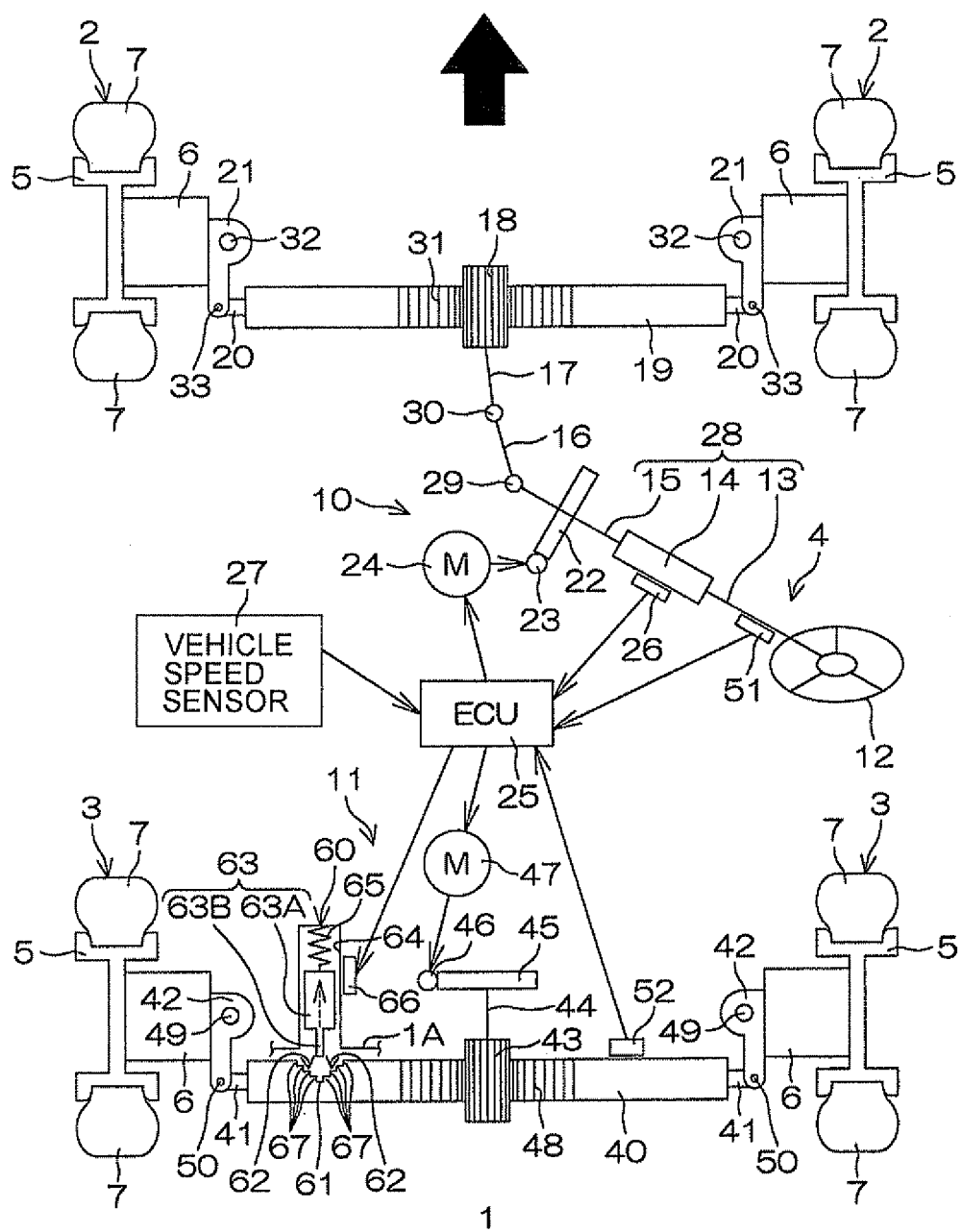
FIG. 1 is a schematic plan view of a four-wheel steering vehicle 1 according to an embodiment of the invention, and shows a state where the four-wheel steering vehicle 1 is travelling straight ahead at a low speed.
Figure 2:
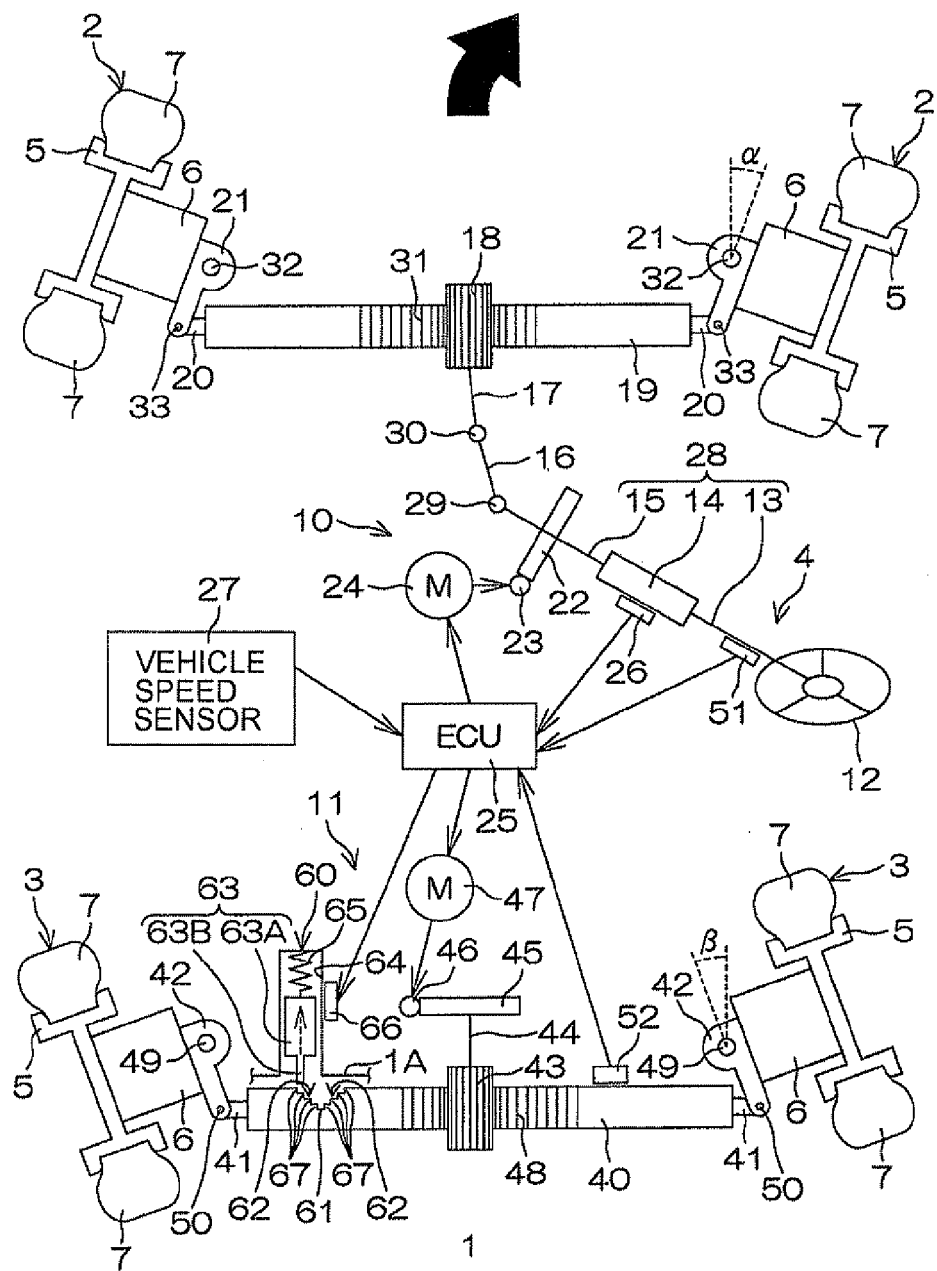
FIG. 2 is a schematic plan view of the four-wheel steering vehicle 1, and shows a state where the four-wheel steering vehicle 1 is turning at a low speed.

Hereinafter, an embodiment of the invention will be described in detail with reference to the accompanying drawings. FIG. 1 is a schematic plan view of a four-wheel steering vehicle 1 according to the embodiment of the invention, and shows a state where the four-wheel steering vehicle 1 is travelling straight ahead at a low speed. FIG. 2 is a schematic plan view of the four-wheel steering vehicle 1, and shows a state where the four-wheel steering vehicle 1 is turning at a low speed. Note that, in the following description, the direction of the four-wheel steering vehicle 1 is defined with reference to the position of the four-wheel steering vehicle 1 shown in FIG. 1. Specifically, in FIG. 1, the left side of the sheet is the left side of the four-wheel steering vehicle 1, the right side of the sheet is the right side of the four-wheel steering vehicle 1, the upper side of the sheet is the front side of the four-wheel steering vehicle 1, and the lower side of the sheet is the rear side of the four-wheel steering vehicle 1. The lateral direction of FIG. 1 is the vehicle-width direction of the four-wheel steering vehicle 1. The illustrated thick arrow indicates the travelling direction of the four-wheel steering vehicle 1 (This also applies to FIG. 2, and FIG. 3, FIG. 4 and FIG. 5A to FIG. 5E (described later)).

As shown in FIG. 1, the four-wheel steering vehicle 1 includes a pair of right and left front wheels 2, a pair of right and left rear wheels 3 and a four-wheel steering system 4. Each of the front wheels 2 and the rear wheels 3 includes a cylindrical wheel 5, a cylindrical or columnar hub 6 and an annular tire 7. The cylindrical or columnar hub 6 is fitted to the wheel 5. The tire 7 is fitted to the outer periphery of the wheel 5. The direction of the rotation axis of each of the front wheels 2 and the rear wheels 3 coincides with the direction of the axis of the corresponding wheel 5, hub 6 and tire 7.

The four-wheel steering system 4 includes a front wheel steering system 10 and a rear wheel steering system 11. The front wheel steering system 10 includes a steering wheel 12, an input shaft 13, a torsion bar 14, an output shaft 15, an intermediate shaft 16, a pinion shaft 17, a front pinion 18, a front rack shaft 19, tie rods 20, knuckle arms 21, a worm wheel 22 and a worm gear 23. Furthermore, the front wheel steering system 10 includes a first electric motor 24, an electronic control unit (ECU) 25, a torque sensor 26 and a vehicle speed sensor 27. The ECU 25 serves as advance/retraction control means of a pin member described later.

The steering wheel 12 is coupled to the input shaft 13. The input shaft 13 is coupled to the output shaft 15 via the torsion bar 14. The input shaft 13, the torsion bar 14 and the output shaft 15 are arranged so as to be coaxial with one another, and constitute a steering shaft 28. When the steering wheel 12 is rotated (steered), the steering shaft 28 rotates together with the steering wheel 12. At this time, the torsion bar 14 is twisted, and the input shaft 13 and the output shaft 15 are displaced relative to each other in the rotation direction. The output shaft 15 is coupled to the intermediate shaft 16 via a universal joint 29. The intermediate shaft 16 is coupled to the pinion shaft 17 via a universal joint 30. The front pinion 18 is coupled to the pinion shaft 17.

The front rack shaft 19 extends in the vehicle-width direction, and is slidable in the vehicle-width direction within a predetermined range. A rack 31 is formed in a longitudinally middle portion (here, a longitudinal center portion) of the front rack shaft 19, and formed over a predetermined range in the longitudinal direction. The front pinion 18 and the rack 31 are in mesh with each other, thereby constituting a rack and pinion mechanism. The tie rods 20 are coupled to respective longitudinal ends of the front rack shaft 19.

The knuckle arms 21 are fitted to the respective hubs 6 of the front wheels 2. A king pin 32 extending from a vehicle body 1A of the four-wheel steering vehicle 1 is passed through each knuckle arm 21. Each front wheel 2 is able to be steered about the corresponding king pin 32. In addition, a portion of the knuckle arm 21 for the left front wheel 2, the portion being located behind the king pin 32, is coupled to the left tie rod 20 via a link pin 33. A portion of the knuckle arm 21 for the right front wheel 2, the portion being located behind the king pin 32, is coupled to the right tie rod 20 via a link pin 33.

The worm wheel 22 is integrated with the output shaft 15. The worm gear 23 is in mesh with the worm wheel 22. The output shaft (not shown) of the first electric motor 24 is coupled to the worm gear 23. When the first electric motor 24 is driven, the worm gear 23 rotates, and, accordingly, the worm wheel 22 rotates. The worm wheel 22 rotates to apply assist torque to the steering shaft 28 and the steering wheel 12. Note that a transmission mechanism, other than the worm wheel 22 and the worm gear 23, may be interposed between the first electric motor 24 and the steering shaft 28.

The ECU 25 controls the first electric motor 24. The torque sensor 26 detects the rotation torque (also referred to as steering torque) of the steering wheel 12 on the basis of a relative displacement in the rotation direction between the input shaft 13 and the output shaft 15 when the steering wheel 12 is rotated. The vehicle speed sensor 27 detects the vehicle speed (travelling speed) of the four-wheel steering vehicle 1.

In FIG. 1, the right and left front wheels 2 are not steered, and are placed in a neutral state (state where the steered angle is zero). The position of the front rack shaft 19 in the vehicle-width direction in this state is called a neutral position. When the front rack shaft 19 is in the neutral position, the front pinion 18 is in mesh with the longitudinal center portion of the rack 31. In this state, when the steering wheel 12 is rotated in one of the directions (here, the clockwise direction in FIG. 1), the steering shaft 28, the intermediate shaft 16, the pinion shaft 17 and the front pinion 18 rotate together with the steering wheel 12. Then, with the rotation of the front pinion 18, the front rack shaft 19 slides to one side (here, left side) in the vehicle-width direction. In accordance with sliding of the front rack shaft 19, the portion of the knuckle arm 21 for each front wheel 2, the portion being coupled to the tie rod 20, is displaced in the direction in which the front rack shaft 19 slides, and, accordingly, the right and left front wheels 2 are steered about the corresponding king pins 32. The state after the right and left front wheels 2 are rotated is shown in FIG. 2. In FIG. 2, the steered angle α of the front wheels 2 is shown.

In this state, when the steering wheel 12 is rotated in the opposite direction by the same amount as that when the steering wheel 12 was rotated immediately before the present rotation, the front rack shaft 19 returns to the neutral position and the right and left front wheels 2 return to the neutral state as shown in FIG. 1. When the steering wheel 12 is rotated, the ECU 25 calculates the magnitude of assist torque required for the steering wheel 12 on the basis of the steering torque detected by the torque sensor 26 and the vehicle speed detected by the vehicle speed sensor 27. Then, the ECU 25 controls driving of the first electric motor 24 such that the assist torque having the calculated magnitude is applied from the worm wheel 22 to the steering shaft 28 (steering wheel 12). In this way, the front wheel steering system 10 constitutes a so-called electric power steering system. Therefore, a driver is able to rotate the steering wheel 12 with a small force to steer the front wheels 2.

The rear wheel steering system 11 includes a rear rack shaft 40, tie rods 41, knuckle arms 42, a rear pinion 43, a pinion shaft 44, a worm wheel 45, a worm gear 46, a second electric motor 47, a steering sensor 51 and a rack shaft sensor 52. The rear rack shaft 40 serves as a coupling arm. Furthermore, the rear wheel steering system 11 further includes the above-described ECU 25 and vehicle speed sensor 27.

The rear rack shaft 40 extends in the vehicle-width direction, and is slidable in the vehicle-width direction within a predetermined range. A rack 48 is formed in a longitudinally middle portion (here, a longitudinal center portion) of the rear rack shaft 40, and formed over a predetermined range in the longitudinal direction. The tie rods 41 are coupled to respective longitudinal ends of the rear rack shaft 40. Each knuckle arm 42 is fitted to the hub 6 of the corresponding rear wheel 3. A king pin 49 extending from the vehicle body 1A of the four-wheel steering vehicle 1 is passed through each knuckle arm 42. Each rear wheel 3 is able to be steered about the corresponding king pin 49. In addition, a portion of the knuckle arm 42 for the left rear wheel 3, the portion being located behind the king pin 49, is coupled to the left tie rod 41 via a link pin 50, and a portion of the knuckle arm 42 for the right rear wheel 3, the portion being located behind the king pin 49, is coupled to the right tie rod 41 via a link pin 50. Therefore, the rear rack shaft 40 is provided between and connected to the pair of right and left rear wheels 3 via the tie rods 41 and the knuckle arms 42.

The rear pinion 43 is in mesh with the rack 48 of the rear rack shaft 40. Thus, the rear pinion 43 and the rack 48 constitute a rack and pinion mechanism. The rear pinion 43 is coupled to the pinion shaft 44. The worm wheel 45 is integrated with the pinion shaft 44 and the rear pinion 43. The worm gear 46 is in mesh with the worm wheel 45. The output shaft (not shown) of the second electric motor 47 is coupled to the worm gear 46. When the second electric motor 47 is driven, the worm gear 46 and the worm wheel 45 rotate. Thus, the rear pinion 43 rotates, and the rear rack shaft 40 slides in accordance with the rotation of the rear pinion 43. The ECU 25 controls the second electric motor 47. Note that the output shaft (not shown) of the second electric motor 47 may be directly coupled to the rear pinion 43.

The steering sensor 51 detects the rotation direction and rotation amount of the steering wheel 12. The rack shaft sensor 52 detects the position of the rear rack shaft 40 in the vehicle-width direction. In FIG. 1, the right and left rear wheels 3 are not steered, and are in a neutral state. The position of the rear rack shaft 40 in the vehicle-width direction at this time is called a neutral position. When the rear rack shaft 40 is in the neutral position, the rear pinion 43 is in mesh with the longitudinal center portion of the rack 48. In this state, when the steering wheel 12 is rotated in one of the directions (here, the clockwise direction in FIG. 1), the ECU 25 drives the second electric motor 47. At this time, the ECU 25 controls the rotation direction of the rotor (not shown) of the second electric motor 47 and the number of revolutions or rotation speed of the second electric motor 47 on the basis of the rotation direction and rotation amount of the steering wheel 12, detected by the steering sensor 51, and the vehicle speed detected by the vehicle speed sensor 27. By driving the second electric motor 47 in this way, the rear pinion 43 rotates to slide the rear rack shaft 40 to one side (here, right side) in the vehicle-width direction. In accordance with sliding of the rear rack shaft 40, the portion of the knuckle arm 42 for each rear wheel 3, the portion being coupled to the tie rod 41, is displaced in the direction in which the rear rack shaft 40 slides, and, accordingly, the right and left rear wheels 3 are steered about the corresponding king pins 49. The state after the right and left rear wheels 3 are steered is shown in FIG. 2. In FIG. 2, the steered angle β of the rear wheels 3 is shown. The rear rack shaft 40 slides in the vehicle-width direction to steer the right and left rear wheels 3.

In this state, when the steering wheel 12 is rotated in the opposite direction by the same amount as that when the steering wheel 12 was rotated immediately before the present rotation, the rear rack shaft 40 returns to the neutral position and the right and left rear wheels 3 return to the neutral state by driving the second electric motor 47 as shown in FIG. 1. In this way, it is possible to steer both the front wheels 2 and the rear wheels 3 of the four-wheel steering vehicle 1. The rear wheels 3 are steered by driving the second electric motor 47, not by the human power for rotating the steering wheel 12. In addition, as shown in FIG. 2, when the steered direction (rightward direction in FIG. 2) of the front wheels 2 and the steered direction (leftward direction in FIG. 2) of the rear wheels 3 are made opposite to each other, the four-wheel steering vehicle 1 is turned in a small radius in the steered direction of the front wheels 2. In addition, the front wheels 2 and the rear wheels 3 may be steered in the same direction depending on settings. In this case, the four-wheel steering vehicle 1 is able to be moved straight in a direction oblique rightward or leftward with respect to the longitudinal direction (moved in an oblique direction). The four-wheel steering vehicle 1 is turned in a small radius or moved in an oblique direction in this way. Thus, it is possible to smoothly park the four-wheel steering vehicle 1. Note that, when both the front wheels 2 and the rear wheels 3 are steered, the steered angle α of the front wheels 2 is usually larger than the steered angle β of the rear wheels 3. However, the steered angle α and the steered angle β may be equal to each other. In addition, when the steering wheel 12 is rotated, the timing at which steering of the front wheels 2 is started and the timing at which steering of the rear wheels 3 is started may be differ from each other.

Figure 3:
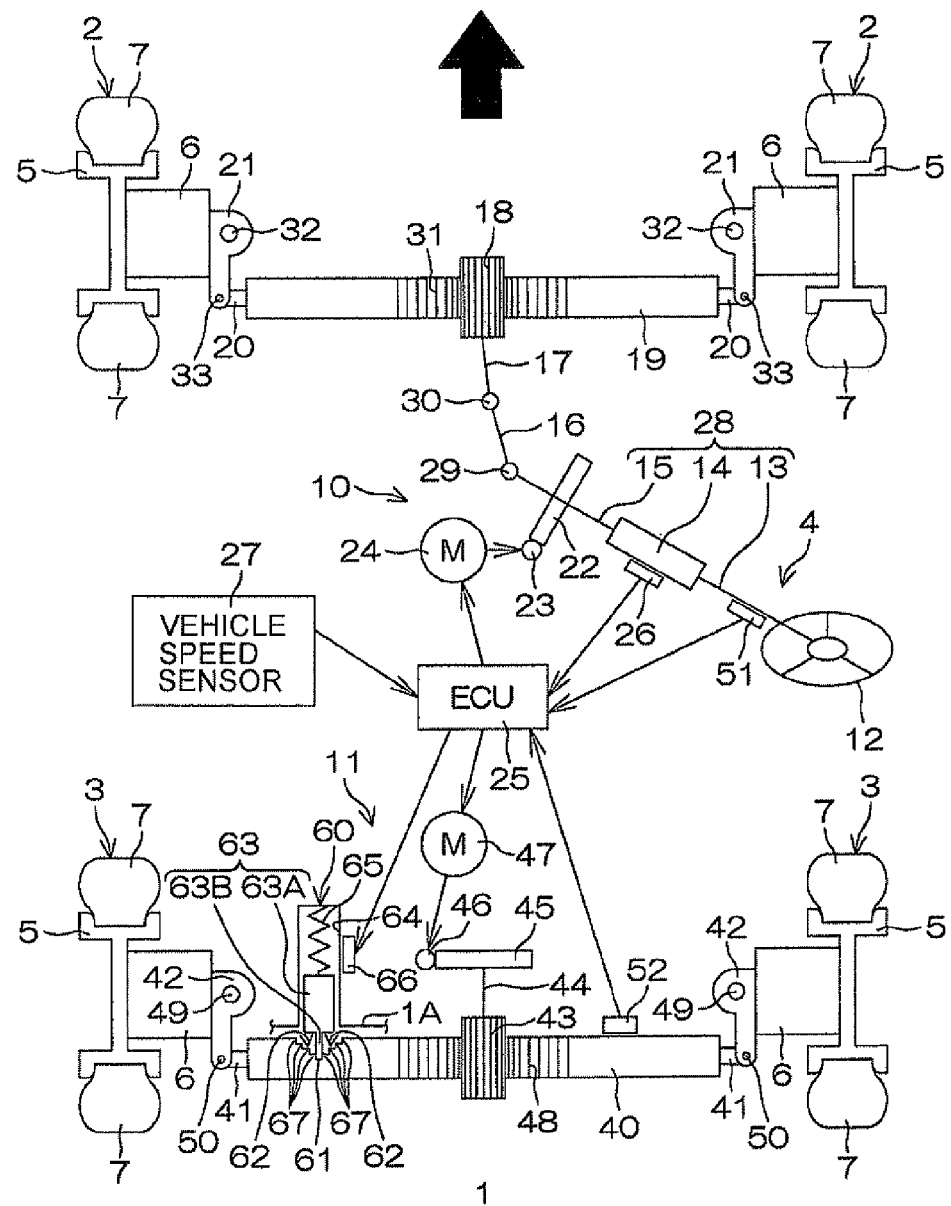
FIG. 3 is a schematic plan view of the four-wheel steering vehicle 1, and shows a state where the four-wheel steering vehicle 1 is travelling straight ahead at a high speed.
Figure 4:
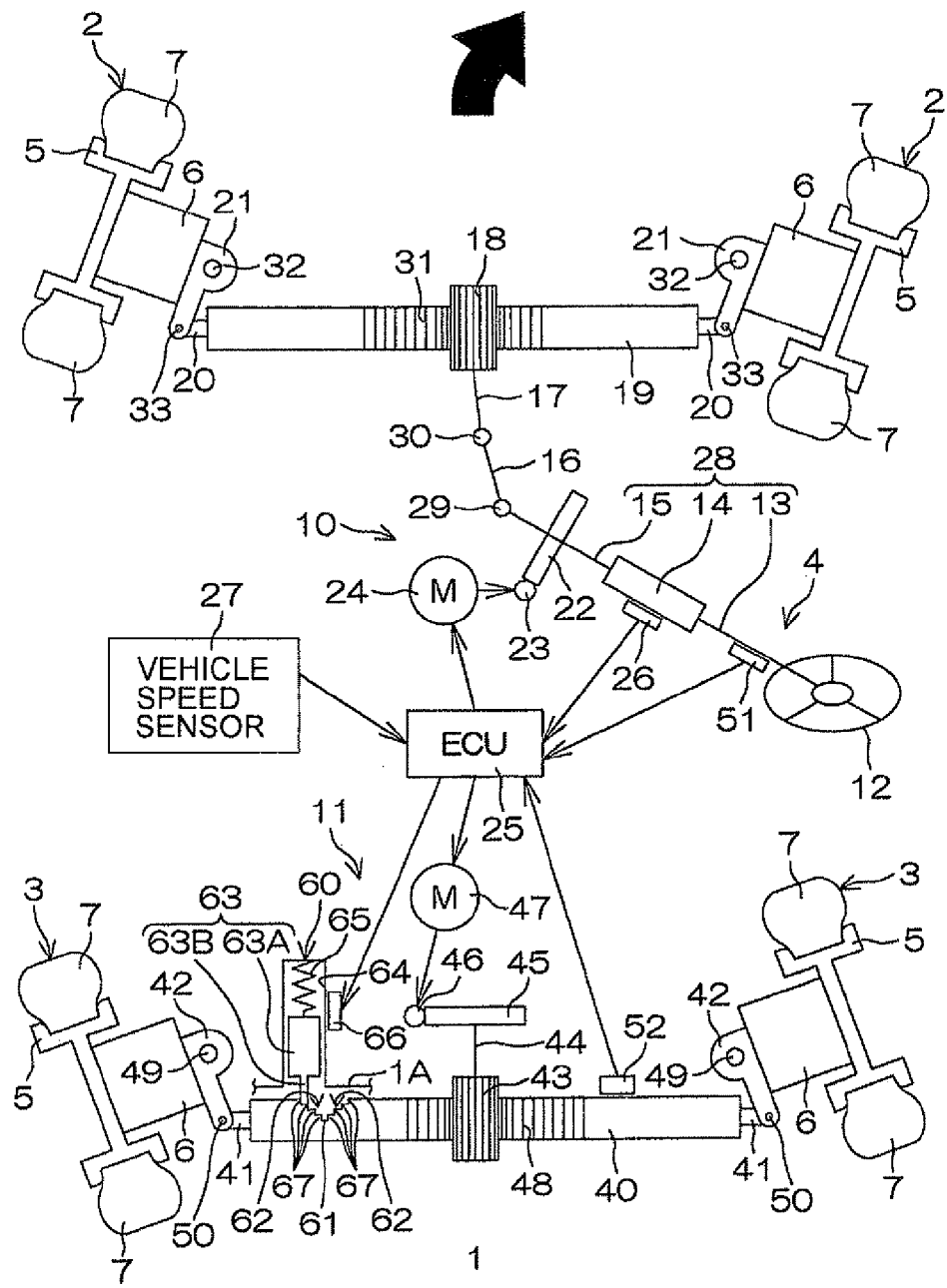
FIG. 4 shows a state where rear wheels 3 are locked while being steered as shown in FIG. 2.

As shown in FIG. 1, the rear wheel steering system 11 further includes a steering lock mechanism 60. FIG. 3 is a schematic plan view of the four-wheel steering vehicle 1, and shows a state where the four-wheel steering vehicle 1 is travelling straight ahead at a high speed. FIG. 4 shows a state where the rear wheels 3 are locked while being steered in FIG. 2. FIG. 5A shows a state where the front wheels 2 are returned to the neutral state from FIG. 4. FIG. 5B is an enlarged view of a main portion in FIG. 5A. FIG. 5C to FIG. 5E show a transition in the state of the main portion shown in FIG. 5A in a time sequence as the four-wheel steering vehicle 1 travels straight ahead.

The steering lock mechanism 60 includes a recess 61, guide grooves 62, a pin member 63, a guide dent 64, an urging member 65 and an actuator 66. The recess 61 is formed on the surface of the rear rack shaft 40 at a position outside the rack 48 (in FIG. 1, a position on the left side of the rack 48), and is recessed toward the center axis of the rear rack shaft 40. The guide grooves 62 are formed on the surface of the rear rack shaft 40. More specifically, the guide grooves 62 are formed on respective sides of the recess 61 in the longitudinal direction of the rear rack shaft 40 (vehicle-width direction) so as to be contiguous with the recess 61. That is, the guide grooves 62 are formed so as to be contiguous with respective sides of the recess 61 in the vehicle-width direction. The guide grooves 62 shown in FIG. 1 each gradually deepen in a stepwise manner toward the recess 61. Therefore, the guide grooves 62 each have a predetermined number of (here, four) steps 67 that are formed on corresponding side of the recess 61 in the vehicle-width direction. On both sides of the recess 61 in the vehicle-width direction, the steps 67 are arranged successively and inclined such that the distance between the guide grooves 62 in the vehicle-width direction is gradually reduced toward the recess 61 along the depth direction of the recess 61. A set of the stepwise guide grooves 62 and the recess 61 forms an inverted pyramid cross section in the rear rack shaft 40.

In addition, the overall size of the guide grooves 62 in the vehicle-width direction is set to be larger than or equal to the sliding range (also referred to as maximum stroke width) of the rear rack shaft 40. The pin member 63 is a single piece member that has a rod-shaped body 63A and a long and thin pin-shaped distal end 63B that protrudes from the body 63A. The guide dent 64 is formed in the vehicle body 1A at a position that faces the rear rack shaft 40, and is a long and thin dent that extends in a direction away from the rear rack shaft 40. The pin member 63 is accommodated in the guide dent 64 with the distal end 63B facing the rear rack shaft 40. In the pin member 63, the body 63A is located closer to the bottom of the guide dent 64 than the distal end 63B. The pin member 63 is slidable when being accommodated in the guide dent 64.

When the rear rack shaft 40 is in the neutral position in which the rear rack shaft 40 does not slide in the vehicle-width direction as shown in FIG. 1, the pin member 63 (particularly, the distal end 63B) accommodated in the guide dent 64 is located in a position in which the pin member 63 faces the recess 61 from the outer side of the rear rack shaft 40. That is, the pin member 63 (distal end 63B) is located in the same position in the vehicle-width direction as the recess 61 of the rear rack shaft 40 placed in the neutral position. At this time, the distal end 63B of the pin member 63 is able to be fitted into the recess 61 from the outer side of the rear rack shaft 40 (see FIG. 3).

As described above, the overall size of the guide grooves 62 in the vehicle-width direction is larger than or equal to the sliding range of the rear rack shaft 40. Therefore, even when the rear rack shaft 40 is in any position (except the neutral position) within the slidable range, the pin member 63 (distal end 63B) reliably faces the guide grooves 62. The urging member 65 is, for example, a compression spring, and is arranged in a compressed state between the bottom of the guide dent 64 and the body 63A of the pin member 63. The urging member 65 urges the entirety of the pin member 63 by the extending urging force in such a direction that the pin member 63 comes out of the guide dent 64 and approaches the recess 61 of the rear rack shaft 40.

The actuator 66 includes, for example, a solenoid, and is turned on and off under the control by the ECU 25. When the actuator 66 is in the on state, the actuator 66 urges the pin member 63 in such a direction that entirety of the pin member 63 is pushed into the guide dent 64 (direction of the broken-line arrow). When the actuator 66 is turned off, the actuator 66 stops urging the pin member 63 toward the direction of the broken-line arrow. Therefore, the pin member 63 is placed in a retracted state and almost entirely accommodated in the guide dent 64 when the actuator 66 is in the on state (see FIG. 1 and FIG. 2); whereas the pin member 63 is urged by only the urging member 65 and is placed in an advanced state where the pin member 63 partially protrudes from the guide dent 64 toward the rear rack shaft 40 when the actuator 66 is in the off state (see FIG. 3 to FIG. 5E). The ECU 25 controls the on/off state of the actuator 66 to place the pin member 63 in the retracted state or in the advanced state. Note that the pin member 63 in the retracted state does not interfere with sliding of the rear rack shaft 40.

At least part of the pin member 63 is always accommodated in the guide dent 64. Therefore, although the pin member 63 is slidable to be switched between the advanced state and the retracted state, the pin member 63 is not allowed to move in the vehicle-width direction. Therefore, as shown in FIG. 3, the pin member 63 that is in the advanced state when the rear rack shaft 40 is in the neutral position is fitted at its distal end 63B into the recess 61. Thus, the pin member 63 locks sliding of the rear rack shaft 40 placed in the neutral position. On the other hand, as shown in FIG. 1, the pin member 63 in the retracted state is disengaged from the recess 61 to cancel slide lock on the rear rack shaft 40.

Next, the operation of the steering lock mechanism 60 while the four-wheel steering vehicle 1 is travelling will be described. The travelling state of the four-wheel steering vehicle 1 is classified into a low-speed state where the vehicle speed is lower than or equal to a predetermined speed (for example, 10 km/h) and a high-speed state where the vehicle speed is higher than the predetermined speed. The four-wheel steering vehicle 1 at the time of parking is in the low-speed state. The ECU 25 determines the travelling state of the four-wheel steering vehicle 1 on the basis of the result detected by the vehicle speed sensor 27.

In the low-speed state, the frequency at which the four-wheel steering vehicle 1 is turned in a small radius is high. Therefore, the ECU 25 places the pin member 63 in the retracted state to cancel slide lock on the rear rack shaft 40 so that not only the front wheels 2 but also the rear wheel 3 are steered (see FIG. 1). Thus, not only the front wheels 2 but also the rear wheel 3 are able to be steered as shown in FIG. 2. Therefore, it is possible to turn the four-wheel steering vehicle 1 in a small radius in the low-speed state.

On the other hand, in the high-speed state shown in FIG. 3, it is desirable that the rear wheels 3 should be locked in the neutral state and should not be steered in order to stabilize the vehicle body of the four-wheel steering vehicle 1. Therefore, the ECU 25 first drives the second electric motor 47 to place the rear rack shaft 40 in the neutral position and then places the pin member 63 in the advanced state to thereby lock the rear rack shaft 40 in the neutral position. Thus, the rear wheels 3 are locked in the neutral state and are not allowed to be steered.

The ECU 25 determines whether the rear rack shaft 40 is in the neutral position on the basis of the result detected by the rack shaft sensor 52. In addition, the ECU 25 may return the rear rack shaft 40 to the neutral position in accordance with the return of the front wheels 2, which have been steered up to now, to the neutral state or may return the rear rack shaft 40 to the neutral position immediately before the four-wheel steering vehicle 1 shifts from the low-speed state to the high-speed state irrespective of the steered state of the front wheels 2.

If the rear rack shaft 40 is not in the neutral position in the low-speed state as shown in FIG. 4, it is anticipated that sliding of the rear rack shaft 40 (steering of the rear wheels 3) will be locked because the pin member 63 is placed in the advanced state before the rear wheels 3 completely return to the neutral state and the pin member 63 contacts the rear rack shaft 40. A cause of this problem may be as follows. Although the ECU 25 has not output an off command, the actuator 66 is turned off due to a failure, and consequently the pin member 63 is placed in the advanced state. Another cause of this problem may be as follows. The ECU 25 determines that the rear rack shaft 40 is in the neutral position although the rear rack shaft 40 is actually not in the neutral position, due to a false detection by the rack shaft sensor 52, and consequently the pin member 63 is placed in the advanced state.

In this way, even if the pin member 63 is placed in the advanced state when the rear wheels 3 have not been returned to the neutral state, the distal end 63B of the pin member 63 in the advanced state is fitted into the guide grooves 62 because there are always the guide grooves 62 ahead of the pin member 63. As shown in FIG. 4, if the pin member 63 is placed in the advanced state with the rear wheels 3 fully steered, the distal end 63B of the pin member 63 is fitted into an end portion of the guide grooves 62 in the vehicle-width direction. In FIG. 4, the distal end 63B of the pin member 63 is engaged with one of the steps 67, which is at the end portion (left end portion in FIG. 4) of the guide grooves 62, in the vehicle-width direction. At this time, because the distal end 63B of the pin member 63 is in contact with the rear rack shaft 40 at a portion in the guide grooves 62, sliding of the rear rack shaft 40 is locked, and is locked with the rear wheels 3 in the steered state.

At this time, the urging member 65 is urging the pin member 63 toward the guide grooves 62, and the distal end 63B of the pin member 63 engages with one of the steps 67 of the guide grooves 62 in the vehicle-width direction (from the left side in FIG. 4). Thus, it is possible to prevent a situation where the distal end 63B of the pin member 63 is disengaged from the guide grooves 62, the rear rack shaft 40 is further offset from the neutral position and the steered angle of the rear wheels 3 is increased.

In this way, even if steering of the rear wheels 3 is locked before the rear wheels 3 completely return to the neutral state, when the steering wheel 12 is steered to place the front wheels 2 in the neutral state as shown in FIG. 5A, the four-wheel steering vehicle 1 continues to travel straight ahead for a while in the low-speed state. Then, the rear wheels 3 that are locked in the steered state receive self-aligning torque due to reaction force received from a road surface to thereby attempt to return to the neutral state. In the case in FIG. 5A, each rear wheel 3 attempts to be steered to the right. Accordingly, as shown in FIG. 5B, leftward force (see the broken-line arrow) that directs the rear rack shaft 40 toward the neutral position acts on the rear rack shaft 40 provided between and connected to the right and left rear wheels 3, and the rear rack shaft 40 attempts to return to the neutral position. A force by which the rear rack shaft 40 attempts to move due to self-aligning torque is set to be larger than a force that attempts to interfere with lateral movement of the rear rack shaft 40 and that is generated when the pin member 63 is urged by the urging member 65 to push the guide grooves 62.

Thus, the rear rack shaft 40 moves relative to the pin member 63 toward the neutral position (leftward in FIG. 5) in the vehicle-width direction. At this time, as shown in FIG. 5C and FIG. 5D, the distal end 63B of the pin member 63 is guided by the guide grooves 62 to gradually approach the recess 61 within the guide grooves 62. With regard to the distal end 63B of the pin member 63, the distal end 63B of the pin member 63 is sequentially transferred to the steps 67 closer to the recess 61 within the guide grooves 62 to thereby shift toward the recess 61 in the vehicle-width direction and advances deeper within the guide grooves 62. In this way, the guide grooves 62 guide the pin member 63 in the advanced state, toward the recess 61. As the pin member 63 approaches the recess 61, the rear rack shaft 40 gradually approaches the neutral position, and the rear wheels 3 gradually approach the neutral state. Each time the distal end 63B of the pin member 63 is transferred to the step 67 closer to the recess 61, the distal end 63B engages with the immediately preceding step 67 in the vehicle-width direction (from the right side in FIG. 5A to FIG. 5D), and does not move in such a direction as to move away from the recess 61.

Finally, the distal end 63B of the pin member 63 is fitted into the recess 61 as shown in FIG. 5E. At this time, as shown in FIG. 3, the rear rack shaft 40 returns to the neutral position, and the right and left rear wheels 3 return to the neutral state. In a state where the rear rack shaft 40 is returned to the neutral position, the distal end 63B of the pin member 63 is fitted into the recess 61 to lock sliding of the rear rack shaft 40. Therefore, the rear rack shaft 40 is fixed in the neutral position, and the rear wheels 3 are fixed in the neutral state.

In this way, even if the pin member 63 is placed in the advanced state before the rear wheels 3 completely return to the neutral state, the pin member 63 is guided by the guide grooves 62 of the rear rack shaft 40 that attempts to return to the neutral position and is fitted into the recess 61. Accordingly, the position in which the rear rack shaft 40 is locked is corrected to the neutral position. As a result, the rear wheels 3 are reliably returned to the neutral state.

Next, alternative embodiments will be described. FIG. 6A to FIG. 6F are sectional views of a main portion of the rear rack shaft 40 near the recess 61 and the guide grooves 62. FIG. 6A shows guide grooves 62 according to a first alternative embodiment. FIG. 6B shows guide grooves 62 according to a second alternative embodiment. FIG. 6C shows guide grooves 62 according to a third alternative embodiment. FIG. 6D shows guide grooves 62 according to fourth alternative embodiment. FIG. 6E shows guide grooves 62 according to a fifth alternative embodiment. FIG. 6F shows guide grooves 62 according to a sixth alternative embodiment.

In each of FIG. 6A to FIG. 6F, the guide grooves 62 each may be formed in a stepwise manner as described above (see the portion indicated by the dotted line); instead, the guide grooves 62 each may be gradually deepened linearly toward the recess 61 as indicated by the solid line. When the guide grooves 62 each deepen linearly, a groove wall 62A of each guide groove 62 forms a tapered face that extends toward the recess 61 while being inclined with respect to the vehicle-width direction. When the maximum steered angle of the rear wheels 3 is small, the sliding range of the rear rack shaft 40 in the vehicle-width direction is also narrow accordingly, so the size of each guide groove 62 in the vehicle-width direction is also small. FIG. 6A to FIG. 6C show the case where the maximum steered angle of the rear wheels 3 is relatively small. FIG. 6D to FIG. 6F show the case where the maximum steered angle of the rear wheels 3 is relatively large. The maximum steered angle of the rear wheels 3 in the case of FIG. 6D is larger than that in the case of FIG. 6A, so the size X of the guide grooves 62 in the vehicle-width direction in FIG. 6D is larger than that in FIG. 6A accordingly. Similarly, the maximum steered angle of the rear wheels 3 in the case of FIG. 6E is larger than that in the case of FIG. 6B, so the size of the guide grooves 62 in the vehicle-width direction in FIG. 6E is larger than that in FIG. 6B accordingly. The maximum steered angle of the rear wheels 3 in the case of FIG. 6F is larger than that in the case of FIG. 6C, so the size of the guide grooves 62 in the vehicle-width direction in FIG. 6F is larger than that in FIG. 6C accordingly.

In addition, as shown in FIG. 6A and FIG. 6B, even when there is no difference in the maximum steered angle of the rear wheels 3, the rate at which each of the guide grooves 62 deepens is set to be higher as the vehicle speed at which the pin member 63 is placed in the advanced state (the upper limit of the vehicle speed at the boundary between the low-speed state and the high-speed state) becomes higher. "The rate at which each of the guide grooves 62 deepens is high" means that, when the guide grooves 62 each gradually deepen linearly, the inclination angle γ of the groove wall 62A of each of the guide grooves 62 with respect to the vehicle-width direction is large, and, when the guide grooves 62 each gradually deepen in a stepwise manner, the inclination angle γ of a straight line Y that connects the distal ends of the consecutive steps 67 (which is located on the above-described groove wall 62A) is large. The state where the inclination angle γ is large means the state where the inclination of the groove wall 62A or the straight line Y is high.

In the case of FIG. 6A, as the vehicle speed at which the pin member 63 is placed in the advanced state becomes higher, the rate at which each of the guide grooves 62 deepens is set to be higher in FIG. 6B. Similarly, in the case of FIG. 6D, as the vehicle speed at which the pin member 63 is placed in the advanced state becomes higher, the rate at which each of the guide grooves 62 deepens is set to be higher in FIG. 6E. When the guide grooves 62 each are formed in a stepwise manner (see the portion indicated by the dotted line), in order to make the rate at which each of the guide grooves 62 deepens higher, the height of each step 67 in each guide groove 62 (the size of each step 67 in the depth direction of each guide groove 62) may be made larger, the interval between the consecutive steps 67 (the size of each step 67 in the vehicle-width direction) may be made smaller or the number of the steps 67 may be increased.

As shown in FIG. 6B and FIG. 6E, when the rate at which each of the guide grooves 62 deepens is set to be higher as the vehicle speed becomes higher, the pin member 63 that is placed in the advanced state before the rear wheels 3 completely return to the neutral state is guided by the guide grooves 62 that are steeply inclined and is quickly fitted into the recess 61. Therefore, the rear wheels 3 are quickly returned to the neutral state. Note that, when the vehicle speed is low, even if the rear wheels 3 are locked after being steered by a certain amount, lock on the rear wheels does not exert significant influence on travelling of the four-wheel steering vehicle 1. Therefore, the rear wheels 3 do not need to be quickly returned to the neutral state (see FIG. 6A and FIG. 6D). In this case, the rate at which each of the guide grooves 62 deepens may be low, and the guide grooves 62 may be made shallow accordingly. When the guide grooves 62 each are formed in a stepwise manner (see the portion indicated by the dotted line), in order to make the rate at which each of the guide grooves 62 deepens lower, the height of each step 67 in each guide groove 62 may be made smaller, the interval between the consecutive steps 67 may be made larger or the number of the steps 67 may be reduced. Then, by forming the shallow guide grooves 62, the rear rack shaft 40 may be made of an inexpensive material having a less strength.

In addition, in FIG. 6C, the rate at which each of the guide grooves 62 deepens is higher in a second region B than in a first region A. The first region A is closer to the recess 61 than the second region B. The second region B is farther from the recess 61 than the first region A. Similarly, as shown in FIG. 6F, the rate at which each of the guide grooves 62 deepens is higher in a second region B than in a first region A. The first region A is closer to the recess 61 than the second region B. The second region B is farther from the recess 61 than the first region A. In the case of FIG. 6C and FIG. 6F, the pin member 63 that is placed in the advanced state before the rear wheels 3 completely return to the neutral state is guided by the second region B having a steep inclination angle in the guide grooves 62 to thereby quickly head toward the recess 61. Therefore, the rear wheels 3 are quickly returned to near the neutral state.

When the rate at which each of the guide grooves 62 deepens is set to be higher in the second region B than in the first region A, the inclination of each guide groove 62 is steep in the second region B but is gentle in the first region A. In this case, in comparison with the case where the rate at which each of the guide grooves 62 deepens is uniformly high over the entire region of the first region A and the second region B (see FIG. 6B and FIG. 6E), the entire guide grooves 62 is made shallow by a depth C. Thus, the rear rack shaft 40 having the guide grooves 62 is made of an inexpensive material having a less strength.

Note that, in order to minimize the influence on the strength of the rear rack shaft 40, the size of the guide grooves 62 in the vehicle-width direction may be reduced, instead of forming the shallow guide grooves 62.

The invention is not limited to the above-described embodiment. Various changes within the scope of the claims may be made.

What is claimed is:

1. A rear wheel steering system that is applicable to a four-wheel steering vehicle of which front wheels and rear wheels are both able to be steered, comprising:
   a coupling arm that is provided between and connected to a pair of the rear wheels, and that slides in a vehicle-width direction to steer the pair of the rear wheels;
   a recess that is formed in the coupling arm;
   a pin member that is able to be fitted into the recess from an outer side of the coupling arm, that is provided at a position at which the pin member faces the recess when the coupling arm is in a neutral position in which the coupling arm does not slide in the vehicle-width direction, that is fitted into the recess to lock sliding of the coupling arm when the pin member is placed in an advanced state, and that is disengaged from the recess to cancel slide lock on the coupling arm when the pin member is placed in a retracted state; and
   advance/retraction control means for placing the pin member in the retracted state when a vehicle speed is lower than or equal to a predetermined speed and for placing the pin member in the advanced state when the vehicle speed is higher than the predetermined speed, wherein
      the coupling arm has guide grooves that are formed on respective sides of the recess in a longitudinal direction of the coupling arm so as to be contiguous with the recess, and that are used to guide the pin member in the advanced state toward the recess; and
      the guide grooves each gradually deepen in a stepwise manner toward the recess.

2. The rear wheel steering system according to claim 1, wherein a rate at which each of the guide grooves deepens is set to be higher as the vehicle speed becomes higher.

3. A rear wheel steering system that is applicable to a four-wheel steering vehicle of which front wheels and rear wheels are both able to be steered, comprising:
   a coupling arm that is provided between and connected to a pair of the rear wheels, and that slides in a vehicle-width direction to steer the pair of the rear wheels;
   a recess that is formed in the coupling arm;
   a pin member that is able to be fitted into the recess from an outer side of the coupling arm, that is provided at a position at which the pin member faces the recess when the coupling arm is in a neutral position in which the coupling arm does not slide in the vehicle-width direction, that is fitted into the recess to lock sliding of the coupling arm when the pin member is placed in an advanced state, and that is disengaged from the recess to cancel slide lock on the coupling arm when the pin member is placed in a retracted state; and
   advance/retraction control means for placing the pin member in the retracted state when a vehicle speed is lower than or equal to a predetermined speed and for placing the pin member in the advanced state when the vehicle speed is higher than the predetermined speed, wherein
      the coupling arm has guide grooves that are formed on respective sides of the recess in a longitudinal direction of the coupling arm so as to be contiguous with the recess, and that are used to guide the pin member in the advanced state toward the recess;
      the guide grooves each have a first region and a second region that is farther from the recess than the first region; and
      a rate at which each of the guide grooves deepens is higher in the second region than in the first region.

* * * * *